United States Patent
Tsuji

(10) Patent No.: US 7,023,781 B2
(45) Date of Patent: Apr. 4, 2006

(54) OPTICAL DISK APPARATUS

(75) Inventor: Masaaki Tsuji, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 687 days.

(21) Appl. No.: 10/013,626

(22) Filed: Oct. 30, 2001

(65) Prior Publication Data
US 2002/0110061 A1 Aug. 15, 2002

(30) Foreign Application Priority Data
Oct. 31, 2000 (JP) ............................. 2000-332409

(51) Int. Cl.
*G11B 5/09* (2006.01)
(52) U.S. Cl. ................................ 369/53.31; 369/47.32
(58) Field of Classification Search ................ 369/47.3, 369/47.34, 47.33, 47.31, 30.23, 30.24, 53.31, 369/53.35, 53.36, 53.37, 47.32
See application file for complete search history.

(56) References Cited

U.S. PATENT DOCUMENTS 5,504,728 A * 4/1996 Yokota et al. ........... 369/53.24
6,198,707 B1 * 3/2001 Yamamoto ............... 369/47.25

FOREIGN PATENT DOCUMENTS

JP          1049990          2/1998

\* cited by examiner

*Primary Examiner*—Thang V. Tran
(74) *Attorney, Agent, or Firm*—Cooper & Dunham LLP

(57) ABSTRACT

In an optical disk apparatus, when the write-in process to the optical disk is interrupted, a data processing part and an encoder part are set to be in the waiting state after an access to a data storing part is completed, so as to stop accessing the data storing part and also to stop storing data that is to be written. Thus, the interleave can be managed and the DSV calculation can be properly conducted without any irregular calculation. Even in a case in which the write-in process to the optical disk is restarted after temporarily interrupted, it is possible to read data similar to a case in which data to be written is successively written without an interruption.

11 Claims, 9 Drawing Sheets

OPTICAL DISK APPARATUS

BACKGROUND OF THE INVENTION

1. Field of the Invention

The present invention generally relates to an optical disk apparatus for recording and reproducing information to and from a optical disk capable of recording data such as a CD-R/RW, DVD–R/RW, DVD+RW, or a like.

2. Description of the Related Art

Conventionally, it is required to complete writing data to be recorded to the optical disk capable of recording data such as a CD-R/RW, DVD–R/RW, DVD+RW, or a like, at once. Such a conventional once writing operation is called "Track at Once" or "Disc at Once". During the conventional once writing operation, in a case in which a writing speed is faster than a data transmission speed from a host computer and data to be written to the optical disk is interrupted, that is, in a case in which a buffer under-run occurs, it ends up failing to write data to the optical disk.

The faster a data write operation is conducted, the more the buffer under-run occurs. Especially for a medium that is not re-writable such as a CD-R, an occurrence of the buffer under-run is a fatal error. Conventionally, in a method for avoiding the buffer under-run, a capacity of a buffer RAM (Random Access Memory) (for example, a memory consisting of a DRAM (Dynamic Random Access Memory)) is increased or a speed of writing data to the optical disk is set to be slower than that of transmitting data from the host computer.

Japanese Laid-Open Patent Application No.10-49990 discloses that instead of avoiding the buffer under-run, the data write operation is temporarily interrupted when the buffer under-run occurs, the data write operation is resumed from an interrupted location on the optical disk after a sufficient amount of data is transferred from the host computer and accumulated in the buffer RAM. Accordingly, during the data write operation to the optical disk, even when the fatal buffer under-run that is a fatal error occurs, it is possible to complete writing data properly to the optical disk without a failure of writing data.

However, in a recording control as disclosed in the Japanese Laid-Open Patent Application No.10-49990, a data recording operation to the optical disk may be frequently stopped and resumed. Generally, data transferred from the host computer is temporarily maintained in the buffer RAM and a predetermined parity code is encoded and additionally provided in the data. After that, a CIRC process, an EFM (Eight to Fourteen bit Modulation) encoding process, or a like is conducted for the data and the data is recorded as record data on the optical disk. Recently, in a general optical apparatus, a capacity of the buffer RAM is approximately 512 Kbytes to 8 Mbytes.

For example, a recording speed of a CD is 150 Kbytes/sec at standard speed. In correspondence to a recent improvement of the recording speed, the recording speed of the CD becomes 2.4 Mbytes/sec at 16-times speed record. Thus, a recording time for recording the data temporarily maintained in the buffer RAM is relatively limited. That is, it is required to transfer new data during the recording time. Otherwise, the buffer under-run occurs and the recording operation is temporarily stopped. Even though performance of host computer connected to the optical disk apparatus is improved, in order to secure a stable operation for any host computer, it is required for the optical disk to conduct an operation for a case in which the recording operation is temporarily stopped and resumed frequently.

However, under a circumstance in which the recording operation is frequently stopped and resumed, when an end location previously recorded is detected and it is controlled to resume recording precisely from the end location, a displacement amount between absolute location information and a location where data is recorded on the optical disk is accumulated. In this case, when the displacement amount exceeds a constant value, the recording operation cannot be resumed. That is, as described above, a data amount capable of maintaining data transferred from the host computer at once is limited to a maximum capacity of the buffer RAM. Thus, it is required to temporarily stop the recording operation if data is not transferred from the host computer again before the optical disk apparatus completes recording data accumulated in the buffer RAM. The smaller the capacity of the buffer RAM, or the faster the recording speed for recording data to the optical disk, the more frequently the buffer under-run occurs.

SUMMARY OF THE INVENTION

It is a general object of the present invention to provide an optical disk apparatus in which the above-mentioned problems are eliminated.

A more specific object of the present invention is to provide the optical disk apparatus in which even if a write-in process is restarted from an interrupted location on an optical disk after the write-in process is temporarily interrupted while writing data on the optical disk, data written on the optical disk can be read successively and normally as the same as a single write-in process is conducted.

The above objects of the present invention are achieved by an optical disk apparatus for recording and reproducing information to an optical disk capable of recording data in which address information indicating a location of blank area, the optical disk apparatus including: a data storing part temporarily storing data externally transferred to be written on the optical disk for conducting a predetermined data process; a data processing part for conducting the data process for the data stored in the data storing part; an encoding part demodulating and outputting the data processed by the data processing part to be written; a write-in controlling part conducting a operation control of the data processing part and the encoding part and conducting a storing control of storing the data to be written to the storing part; and a write-in operation instruction part detecting a state of interrupting supplying the data to be written to the data storing part, and conducting an operation instruction to the write-in controlling part in accordance with a detection result; wherein when the write-in controlling part interrupts writing data to the optical disk, the write-in controlling part sets the data processing part and the encoding part to be in a waiting state after an access to the data storing part is completed, so that the access to the data storing part is stopped and the data to be written is stopped to store in the data storing part.

According to the present invention, the interleave can be managed and the DSV calculation can be properly conducted without any irregular calculation. Even in a case the write-in process to the optical disk is restarted after temporarily interrupted, it is possible to read data similar to a case in which data to be written is successively written without an interruption.

BRIEF DESCRIPTION OF THE DRAWINGS

In the following, embodiments of the present invention will be described with reference to the accompanying drawings.

DESCRIPTION OF THE PREFERRED EMBODIMENTS

An embodiment according to the present invention will now be described with reference to figures.

Figure 1:
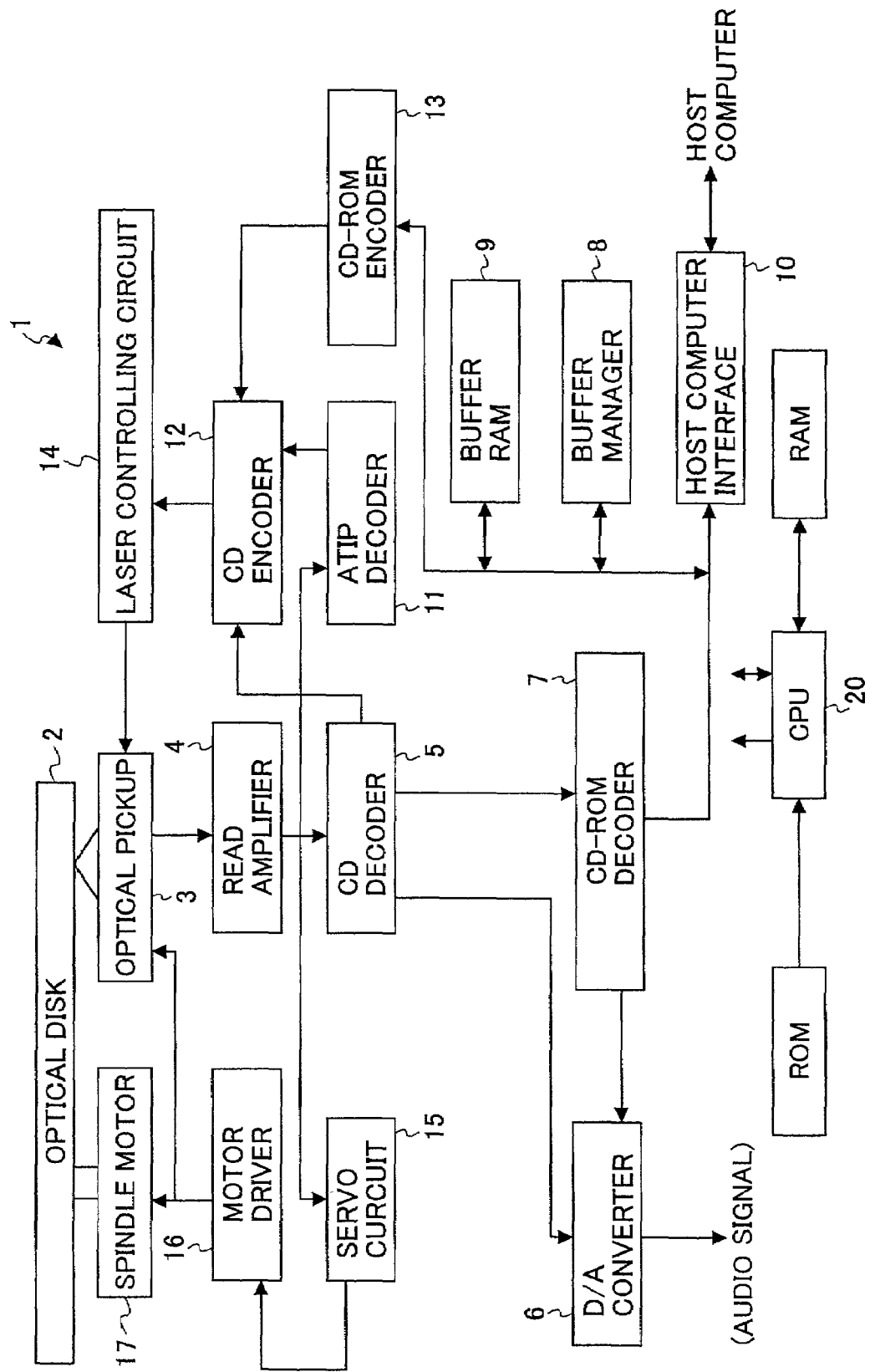
FIG. 1 is a schematic block diagram showing a configuration example of an optical disk apparatus according to the present invention.

FIG. 1 is a schematic block diagram showing a configuration example of an optical disk apparatus according to the present invention. In FIG. 1, a CD-R is exampled. For the sake of convenience, a SYNC pattern is called SYNC.

In the optical disk apparatus of FIG. 1, an optical pickup 3 conducts a data read operation and a data write operation to an optical disk 2 and includes a semiconductor laser, an optical system, a focus actuator, a track actuator, a photo detector, a position sensor, and a like (not shown).

A data signal read by the optical pickup 3 is amplified by a read amplifier 4 to convert into binary data. In order to decode the binary data into decoded data, a CD decoder 5 conducts an EFM modulation and a CIRC calculation (a de-interleave, an error correction, or a like) for the binary data amplified by the read amplifier 4. When the decoded data is used as audio data (hereinafter, called CD data), the D/A (digital to analogue) converter 6 conducts a D/A conversion and outputs the decoded data as an audio signal.

Also, the CD decoder 5 outputs the decoded data that is the CD data or data for a personal computer (hereinafter, called CD-ROM data), to a CD-ROM decoder 7. The CD-ROM decoder 7 stores the decoded data from the CD decoder 5 to a buffer RAM 9 through a buffer manager 8. In addition, the CD-ROM decoder 7 conducts an error correcting process for the decoded data stored in the buffer RAM 9, in order to obtain further reliability of the decoded data.

In this case, the buffer manager 8 handles to read the decoded data stored in the buffer RAM 9 and rewrite the decoded data on the buffer RAM 9.

The decoded data after the error correcting process is conducted by the CD-ROM decoder 7 is read out via the buffer manager 8 and then is transferred to a host computer HC externally connected to the optical disk apparatus 1. A host interface 10 interfaces between the external host computer HC and the optical disk apparatus 1 and for example, the host interface 10 is based on standardization such as an ATAPI (AT attachment packet interface) or a SCSI (Small Computer System Interface).

On the other hand, in the optical disk 2 in which no data is recorded, ATIP data is embodied during a manufacturing stage. When data is recorded in a blank area of the optical disk 2, the ATIP data is read by the optical pickup 3. That is, a Wobble signal on the optical disk 2 is read by the optical pickup 3, amplified to be binary data by the read amplifier 4, and then output to the ATIP decoder 11 as ATIP data.

The ATIP decoder 11 decodes the ATIP data input from the read amplifier 4 to generate a synchronizing signal (hereinafter, called ATIP SYNC) and time information (hereinafter, called ATIP time information). After that, the ATIP SYNC and the ATIP time information are output to a CD encoder 12. When data is written on the blank area of the optical disk 2, the CD encoder 12 encodes the ATIP SYNC and the ATIP time information that is important information to detect a write location. Thus, it is possible to write data from a precise location obtained based on the ATIP SYNC and the ATIP time information from the CD encoder 12.

As described above, in the blank area of the optical disk 2, the ATIP time information showing a blank area location of the optical disk 2 can be obtain only from the ATIP data. On the contrary, in a recorded data of the optical disk 2, since quality of the Wobble signal is lower, the ATIP SYNC and the ATIP time information may not be precisely generated by the ATIP decoder 11. However, in the recorded area of the optical disk 2, sub-code data is recorded as well as a sub-code SYND for synchronization. The CD decoder 5 conducts a sub-code data process and outputs the time information on the optical disk 2 to the CD encoder 12. When data is written on the recorded area of the optical disk 2, the CD encoder 12 obtains the time information showing the blank area location of the optical disk using the sub-code data.

Data to be written on the optical disk 2 is transferred from the host computer HC to the buffer RAM 9 via the buffer manager 8. The CD-ROM encoder 13 reads data from the buffer RAM 9 via the buffer manager 8 and additionally provides an error correction code, an EDC code, SYNC code, header information, and a like to the data, and then rewrites on the buffer RAM 9.

The CD-ROM encoder 13 reads the data from the buffer RAM 9 via the buffer manager 8 and writes the data on a RAM 31 for a CIRC calculation in the CD encoder 12 (described later). The CD encoder 12 conducts a CIRC calculation for data in the RAM calculation, additionally provides the error correction code, conducts an interleave operation, and further conducts the EFM modulation for the data to output. The data output from the CD encoder 12 is recorded on the optical disk 2 via a laser controlling circuit 14 and the optical pickup 3.

The Wobble signal obtained from the optical disk 2 is input to the servo circuit 15 via the optical pickup 3 and read amplifier 4 and a rotation control signal generated by the servo circuit 15 is supplied to the spindle motor 17 via the motor driver 16. The CD decoder 5, the CD-ROM decoder 7, the host interface 10, the ATIP decoder 11, the CD encoder 12, the CD-ROM encoder 13 and the like are controlled by the CPU 20.

Figure 2:
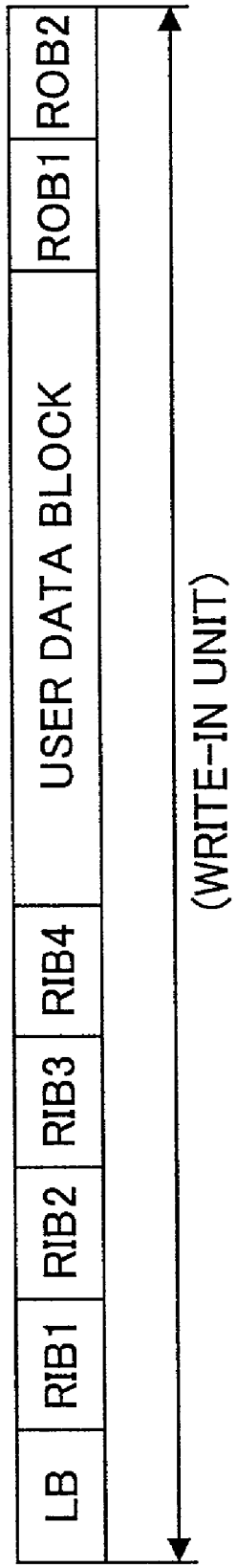
FIG. 2 is a diagram showing a format of a write-in unit for writing data on a CD-R/RW, which is specified in an Orange Book.

FIG. 2 is a diagram showing a format of a write-in unit for writing data on a CD-R/RW, which is specified in an Orange Book. Generally, it is not possible to successfully read data by writing the data on the user data block because of a de-interleave operation when data recorded on the optical disk 2 is reproduced and by a synchronizing operation. Thus, by providing five blocks before the user data block and two redundant blocks after the user data block, the user data block is protected and data can be successfully read.

The five blocks before the user data block includes a link block LB, a 1st through a 4th run-in blocks RIB1 though RIB4. Two blocks after the user data block includes a 1st run-out block ROB1 and a second run-out block ROB2.

Figure 3:
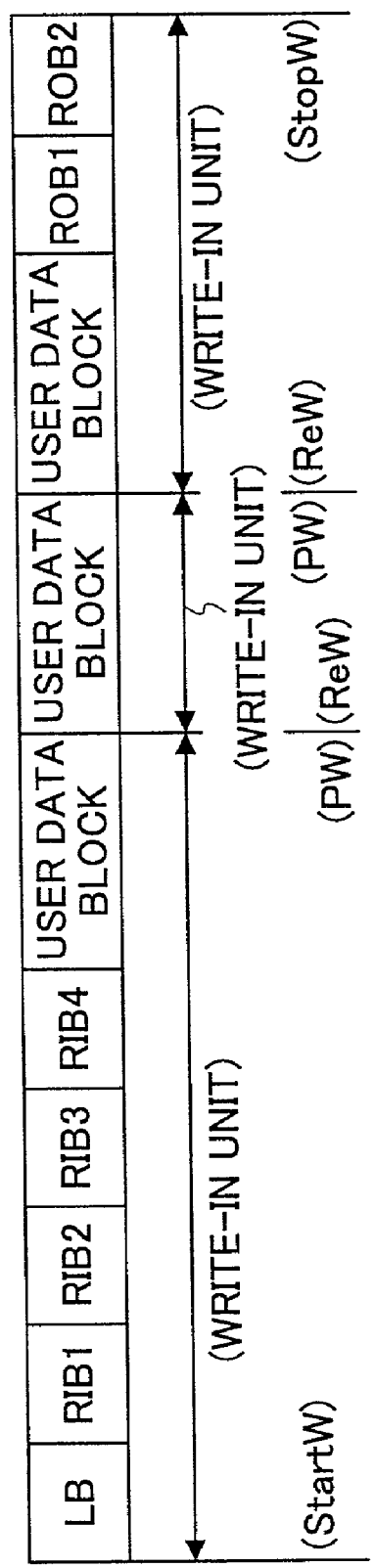
FIG. 3 is a diagram showing a format example of a case in which the user data block shown in FIG. 2 is divided into several user data blocks when recorded on the optical disk.

FIG. 3 is a diagram showing a format example of a case in which the user data block shown in FIG. 2 is divided into several user data blocks when recorded on the optical disk 2.

Data is written in accordance with the format example shown in FIG. 3 when the data from the host computer HC is received, and then the CD encoder 12 execute a start write StartW.

Moreover, the CD encoder 12 starts a write-in process for data to the optical disk 2. When a data amount stored in the buffer RAM 9 is decreased and then the buffer under run is likely to occur, the CD encoder 12 executes a pause write PW to temporarily stop writing data on the optical disk 2. After that, the CD encoder 12 waits for a data transmission from the host computer HC and executes a restart write ReW when the buffer RAM 9 accumulates data. The CD encoder 12 detects a location where the write-in process for the data is temporarily stopped by the pause write PW and then resumes the write-in process for the data from the location.

As described above, the CD encoder 12 repeats a process of temporarily stopping writing data by executing the pause write PW when the data amount becomes smaller to be likely to cause the buffer under run and resuming writing data by the restart write ReW. When data from the host computer HC is written on the optical disk 2, the CD encoder 12 executes a stop write StopW to complete the write-in process. By the write-in process controlled by the CD encoder 12, similar to the format shown in FIG. 2, the write-in process can be conducted as if only one single write-in process is conducted.

A write-in control operation by each part shown in FIG. 1 will now be described.

First, a CPU 20 issues a start write (StartW) instruction and the CD encoder 12 starts a write-in operation to the optical disk 2. Next, the buffer manager 8 receives data transmitted from the host computer HC. The data is stored in the buffer RAM 9. The CPU 20 checks whether or not the data amount of the buffer RAM 9 is decreased to a predetermined lower data amount in accordance with a predetermined method.

When the data amount of the buffer RAM 9 is not decrease to the predetermined lower data amount, the CPU 20 determines whether or not it is completed to write the data to the optical disk 2 in accordance with a predetermined firmware. When the CPU 20 determines that it is completed to write data, the CPU 20 issues a stop write (StopW) instruction to the CD encoder 12 and then the write-in process is terminated. On the other hand, it is not completed to write data, the CD encoder 12 continues to write data to the optical disk 2.

On the other hand, when the CPU 20 determines that the data amount of the buffer RAM 9 decreases to the predetermined lower data amount, the CPU 20 issues the pause write (PW) instruction to the CD encoder 12 and then the write-in process to the optical disk 2 is interrupted. Next, the buffer manager 8 receives data transferred from the host computer HC, the data is stored in the buffer RAM 9, and the CPU 20 determines whether or not the data amount of the buffer RAM 9 reaches a predetermined upper data amount in accordance with a predetermined method.

When the CPU 20 determines that the data amount of the buffer RAM 9 reaches the predetermined upper data amount, the CPU 20 issues the restart write (ReW) instruction to the CD encoder 12 so as to restart the write-in process to the optical disk 2. The buffer manager 8 receives data transferred from the host computer HC and stores in the buffer RAM 9. On the other hand, when the CPU 20 determines that the data amount of the buffer RAM 9 has not reached the predetermined upper data amount, the buffer manager 8 continuously stores data transferred from the host computer HC and stores in the buffer RAM 9.

As described above, when the CPU 20 receives a write command from the host computer HC and a certain data amount, the CPU 20 issues the start write (StartW) instruction for starting writing data. The start write StartW instruction is a regular write sequence beginning from a link block and repeats to write data to the optical disk 2 and receive data from the host computer HC for a predetermined length. During the write-in process, in a case in which a data transmission speed from the host computer HC is slower than a write-in speed to the optical disk 2, it becomes impossible to conduct the write-in process because of a decrease of the data amount in the buffer RAM 9.

Thus, the CPU 20 detects the decrease of the data amount in the buffer RAM 9 and determines that the data transmission is not sufficient, the CPU 20 issues the pause write (PW) instruction so as to interrupt the write-in process. In a case in which the write-in process is interrupted by the pause write (PW) instruction, a write sequence for interrupting the write-in process without writing the run out block is used.

After that, when a sufficient data amount is received from the host computer HC and data is stored in the buffer RAM 9, the CPU 20 issues the restart write (ReW) instruction. In a case of conducting the write-in process by the restart write (ReW), instead of writing data in the link block like the regular write sequence, the write-in process is executed in accordance with a write sequence which is to precisely conduct the write-in process from an end of data which is just written when the write-in process is interrupted, while maintaining a successive data sequence from a write-in location where the write-in process is interrupted and also maintaining synchronization even when the write-in location is positioned. When data is writen on the optical disk 2, the CPU 20 issues the stop write (StopW) instruction. When the write-in process is completed by the stop write (stopW) instruction, the regular write sequence is used to write the run out block.

As described above, the optical disk 1 monitors the data amount in the buffer RAM 9 during the write sequence and repeats the pause write (PW) and the restart write (ReW) to prevent a write failure caused by the buffer under run. Accordingly, when the data transmission is no sufficiently conducted to supply data to the buffer RAM 9 while writing data on the optical disk 2, the write-in process is temporarily interrupted and the write-in process is restarted when a sufficient data amount is transferred from the host computer HC. Therefore, even if the data transmission from the host computer HC is temporarily interrupted or a data transfer rate becomes lower, data can be precisely written on the optical disk 2 by dividing into multiple times. Consequently, it is possible to prevent the write failure caused by the buffer under run. Moreover, the capacity of the buffer RAM 9 absorbing a data transfer flow can be reduced, so that a cost of the optical disk apparatus 1 can be reduced.

Figure 4:
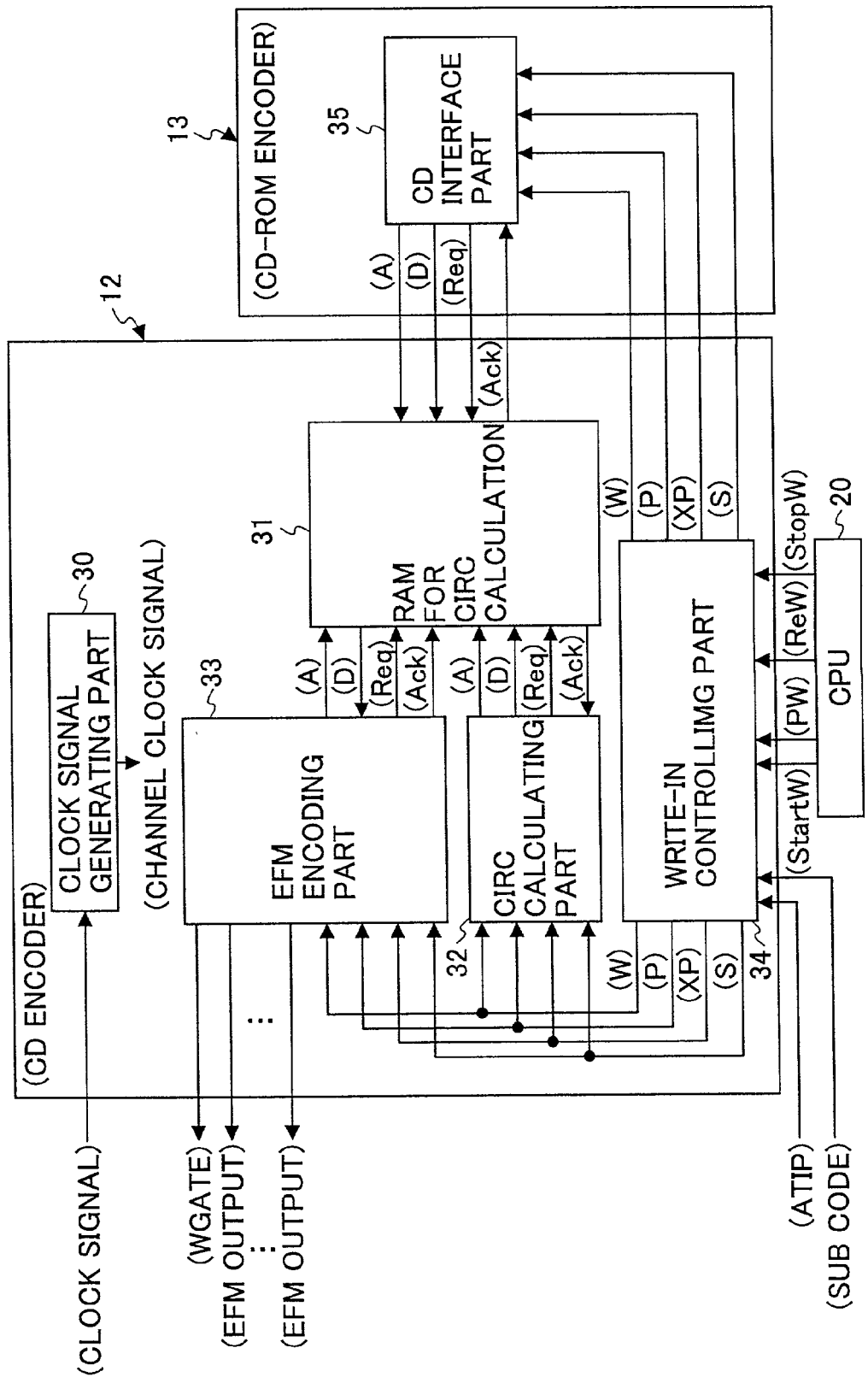
FIG. 4 is a schematic block diagram showing a configuration example of the CD encoder.

FIG. 4 is a schematic block diagram showing a configuration example of the CD encoder 12. In FIG. 4, a write-in operation conducted by the CD encoder 12 to the optical disk 2 will now be described.

Referring FIG. 4, the CD encoder 12 includes a clock signal generating part 30, a RAM 31 for a CIRC calculation, a CIRC calculating part 32, an EFM encoding part 33, and a write-in controlling part 34.

The clock signal generating part 30 generates a channel clock signal being a reference signal for writing data needed in the CD encoder 12, from a clock signal, for example, 33.8688 MHz, inputted from a crystal oscillator (not shown). Then, the clock signal generating part 30 outputs the channel clock signal to each part provided in the CD encoder 12. The RAM 31 for the CIRC calculation temporarily stores data to be written, which is read from the buffer RAM 9 by CD-ROM encoder 13, for the CIRC calculation.

The CIRC calculating part 32 conducts the CIRC calculation for the data stored in the RAM 31 for the CIRC calculation, and further additionally provides an error correction code and conducts the interleave. The EFM encoding part 33 conducts the EFM modulation for the data processed by the CIRC calculating part 32 in accordance with a predetermined method and then outputs to the laser controlling circuit 14. In response to an instruction from the CPU 20, the write-in controlling part 34 generates a control signal for a write control for the CD interface part 35, which interfaces between the CD encoder 12 having the CIRC calculating part 32 and the EFM encoding part 33, and the CD encoder 12. Also, the write-in controlling part 34 outputs the control signal to the CD interface part 35.

In detail, the write-in controlling part 34 generates a predetermined write signal W when the start write (StartW) instruction is input from the CPU 20, generates a predetermined pause signal P when the pause write (PW) instruction is input from the CPU 20, and then outputs to the CIRC calculating part 32, the EFM encoding part 33, and the CD interface part 35. In addition, the write-in controlling part 34 generates a predetermined pause cancel signal PX when the restart write (ReW) instruction, generates a predetermined stop signal S when the step write (StopW) instruction is input from the CPU 20, and then outputs to the CIRC calculating part 32, the EFM encoding part 33, and the CD interface part 35. In FIG. 4, "A" denotes address data, "D" denotes data, "Req" denotes a request signal, and "Ack" denotes an acknowledge singal.

In this configuration, when the pause write (PW) instruction is output from the CPU 20, the write-in controlling part 34 controls the CIRC calculating part 32, the EFM encoding part 33, and the CD interface part 35 to successively conduct the write-in process until a predetermined EFM frame indicating an end of writing. When the write-in process is conducted until an end of the predetermined EFM frame, the CPU 20 controls the CIRC calculating part 32, the EFM encoding part 33, and the CD interface part 35 to interrupt the write-in process. Also, the CIRC calculating part 32, the EFM encoding part 33, and the CD interface part 35, which all access the RAM 31 for the CIRC calculation, completes any calculation and a read-out process required for the EFM frame at the end of the EFM frame. Accordingly, the CIRC calculating part 32, the EFM encoding part 33, and the CD interface part 35 are in a waiting state at relative positions, as stopped at the end of the EFM frame.

In the waiting state, a generating operation for generation the address data, data request signal, and the acknowledge signal is stopped between the CD encoder 12 having the CIRC calculating part 32 and the EFM encoding part 33, and the CD encoder 12. Also, the EFM encoding part 33 cancels to output signals for writing such as the EFM signal, or a write gate signal WGATE. Since an output of the write gate signal WGATE is cancelled, it is interrupted to write data to the optical disk 2.

Since the CIRC calculating part 32 generating data to be written conducts the interleave, the same condition of data cannot be created, and a DSV (Digital Sum Value) calculation conducted by the EFM encoding part 33 becomes irregular when the write-in operation is restarted, it is failed to write data to the optical disk 2 when the buffer under run occurs. When the pause write (PW) instruction is received from the CPU 20, each of the CD-ROM encoder 13, the CIRC calculating part 32, and the EFM encoding part 33, which access the RAM 31 for the CIRC calculation to generate data to be written, becomes in the waiting state at relative position as of a time when completing accessing the RAM 31 for the CIRC calculation. Then, each of the CD-ROM encoder 13, the CIRC calculating part 32, and the EFM encoding part 33 is controlled to restart each operation simultaneously when the write-in operation is restarted, so that the interleave can be managed. Simultaneously, the EFM encoding part 33 is set in the waiting state. Accordingly, the DSV operation can be prevented from being irregular.

In the waiting state (interruption state), when the restart write (ReW) instruction is output from the CPU 20, the write-in controlling part 34 outputs the pause cancel signal PX to the CIRC calculating part 32, the EFM encoding part 33, and the CD interface part 35 after detecting a location to restart to write as described later. As described above, the CIRC calculating part 32, the EFM encoding part 33, and the CD interface part 35 continue to process from the location of the waiting state, and the EFM encoding part 33 restarts to output the EFM signal and the write gate signal WGATE. By restarting to output the EFM signal and the write gate signal WGATE, the write-in process to the optical disk 2 is restarted from the position of the waiting state.

According to the embodiment, it is possible to conduct the write-in process while maintaining a continuity of data to be written at an end location of stopping to write data to the optical disk 2 and at a restart location of restarting to write data. Therefore, it is possible to precisely and successively read out data even after the data write operation is temporarily stopped during the write-in process and then the data write operation is restarted.

Figure 5:
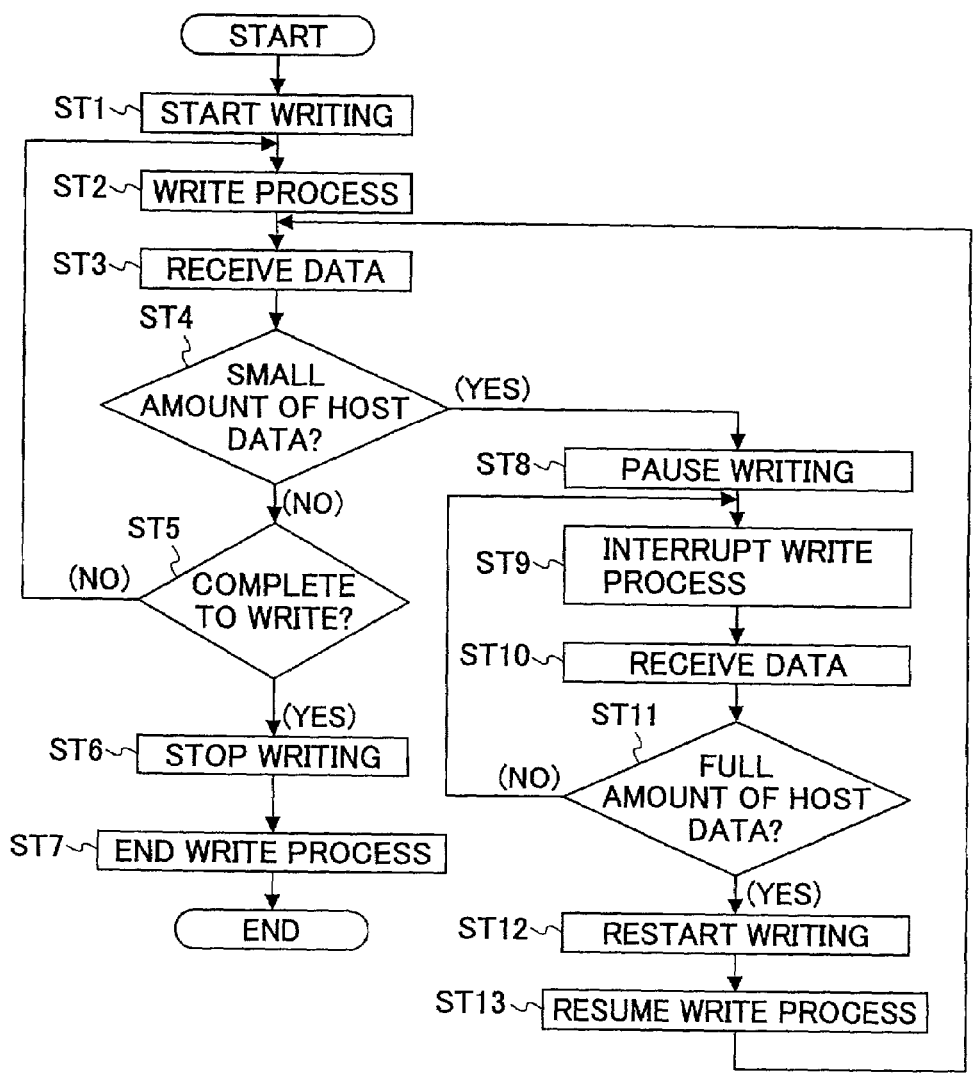
FIG. 5 is a flowchart for explaining the write control operation example conducted in the optical disk apparatus 1 shown in FIG. 1 and FIG. 4.

FIG. 5 is a flowchart for explaining the write control operation example conducted in the optical disk apparatus 1 shown in FIG. 1 and FIG. 4.

In FIG. 5, the CPU 20 issues the start write (StartW) instruction to the write-in controlling part 34 (step ST1). The write-in controlling part 34 outputs the write signal W to the CIRC calculating part 32, the EFM encoding part 33, and the CD interface part 35, and then the data write operation to the optical disk 2 is started (step ST2). Subsequently, the buffer manager 8 receives data transferred from the host computer HC and stores the data in the buffer RAM 9 (step ST3). The CPU 20 checks whether or not the data amount in the buffer RAM 9 is decreased to the predetermined lower data amount in accordance with a predetermined method (step ST4).

When the data amount is not decreased to the predetermined lower data amount (NO) in step ST4, the CPU 20 determines whether or not the data write operation to the optical disk 2 is completed, in accordance with a predetermined firmware (step ST5). When the data write operation is completed (YES) in step ST5, the CPU 20 issues the stop write (StopW) instruction to the write-in controlling part 34 (step ST6). The write-in controlling part 34 outputs the predetermined stop signal S to the CIRC calculating part 32, the EFM encoding part 33, and the CD interface part 35, so as to complete the data write operation to the optical disk 2 (step ST7). Then, the write control operation is terminated. On the other hand, in step ST5, when the data write operation is completed (NO), the write control operation goes back to step ST2.

On the other hand, in step ST4, when it is determined that the data amount in the buffer RAM 9 is decreased to the predetermined lower data amount (YES), the CPU 20 issues the pause write (PW) instruction to the write-in controlling part 34 (step ST8). The write-in controlling part 34 outputs the CIRC calculating part 32, the EFM encoding part 33, and the CD interface part 35, so as to interrupt the data write operation to the optical disk 2 (step ST9). Subsequently, the buffer manager 8 receives data transferred from the host computer HC, and stores the data to the buffer RAM 9 (step ST10). The CPU 20 checks whether or not the data amount in the buffer RAM 9 fills up the buffer RAM 9, that is, the data amount of the buffer RAM 9 reaches the predetermined upper data amount (step ST11).

When it is determined in step ST11 that the data amount reaches the predetermined upper data amount (YES), the CPU 20 issues the restart write (ReW) instruction to the write-in controlling part 34 (step ST12). The write-in controlling part 34 outputs the predetermined pause cancel signal PX to the CIRC calculating part 32, the EFM encoding part 33, and the CD interface part 35, and then the data write operation to the optical disk 2 is restarted (step ST13). The write control operation goes back to the step ST10 so as to continue the write-in process.

Next, a process for detecting a restart write location will now be described.

Figure 6:
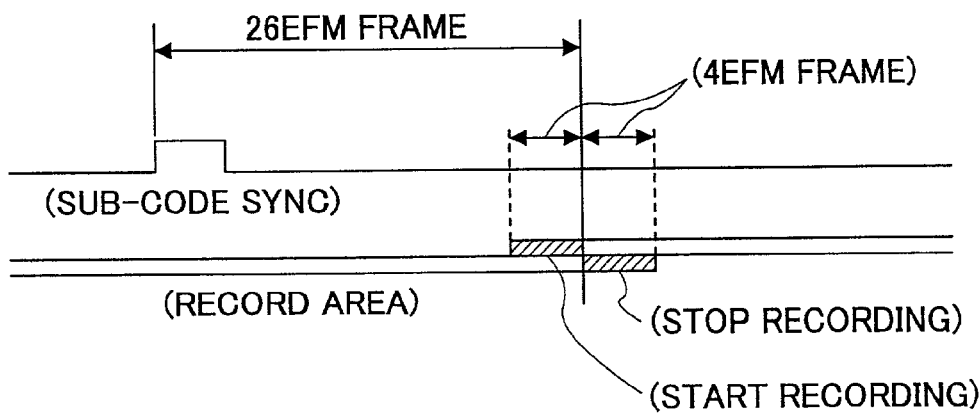
FIG. 6 is a diagram showing a relationship between an end location indicating an end writing data and a start location indicating a start writing data on the optical disk, which is specified by the Orange Book.

FIG. 6 is a diagram showing a relationship between an end location indicating an end writing data and a start location indicating a start writing data on the optical disk 2, which is specified by the Orange Book. Referring to FIG. 6, four EFM frames, which is considerably large data amount, are allowed to overlap in the Red Book. Such a large data amount causes a frame synchronization shift even in the optical disk apparatus 1 used for a CD having higher correction ability and then a normal reproduction cannot be conducted. Such the considerably large data amount is allowed to absorb a rotation control error of the spindle motor 17. That is, a next start write location is determined based on the ATIP SYNC demodulated from the Wobble signal, regardless of data that has written.

Figure 7:
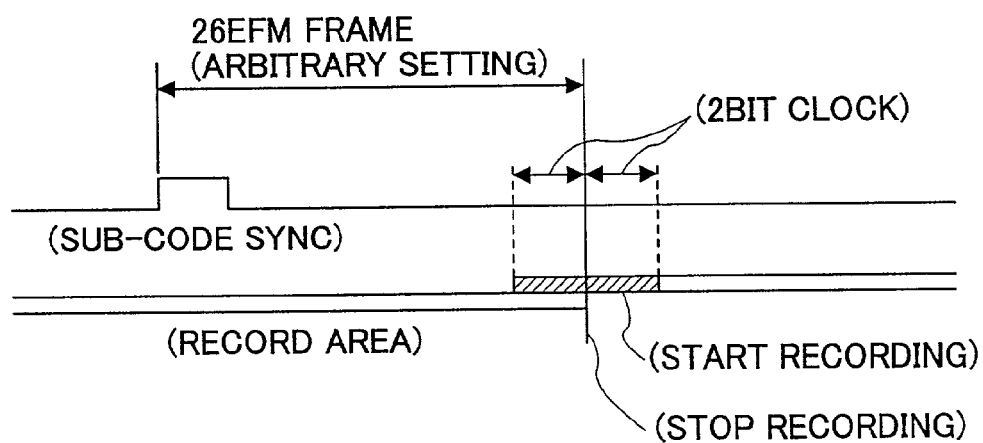
FIG. 7 is a diagram showing an example of data connection on the optical disk.

In order to reproduce data without losing synchronization at a connection location of recording data, a format shown in FIG. 7 is used considering a window width for a frame synchronization protection. That is, in order to write data for a reproduction without losing synchronization, it is required to form the connection location of recording data within a shift of approximately ±2 bit clocks. A write-in control based on an accuracy of the rotation control by the spindle motor in the conventional optical disk apparatus cannot precisely determine a data write-in location as the connection location.

In the optical disk apparatus 1 according to the embodiment of the present invention, when the pause write (PW) instruction is issued by the CPU 20, the write-in control part 34 stores information, which indicates until which EFM frame data is written, on a basis of the time information on that time and the sub-code SYNC (S0 or S1), to an internal register (not shown). The write-in control part 34 writes data until an end of the EFM frame indicated by the information and interrupts the write-in process. In a rewrite-in process by the CPU 20 outputting the restart write (ReW) instruction, the CPU 20 reads out and confirms the connection location on the optical disks 2 where the write-in process is interrupted, and then seeks to position just before the connection location.

After the CPU 20 seeks, the write-in controlling part 34 advances from the ATIP time information or the time information to a time of interrupting to write data, waits for the sub-code SYNC (S0 or S1). Then, the write-in controlling part 34 waits for a frame SYNC for the number of the EFM frames, when the write-in controlling part 34 detects the sub-code SYNC. The write-in controlling part 34 always interrupts to write data at a position of writing the frame SYNC in a case of interrupting to write data. Then, the write-in controlling part 34 restarts to write data after waiting for a demodulation delay time of the frame SYNC from a time when it is interrupted to write data. Thus, it is possible to precisely joint data on the optical disk 2.

Figure 8:
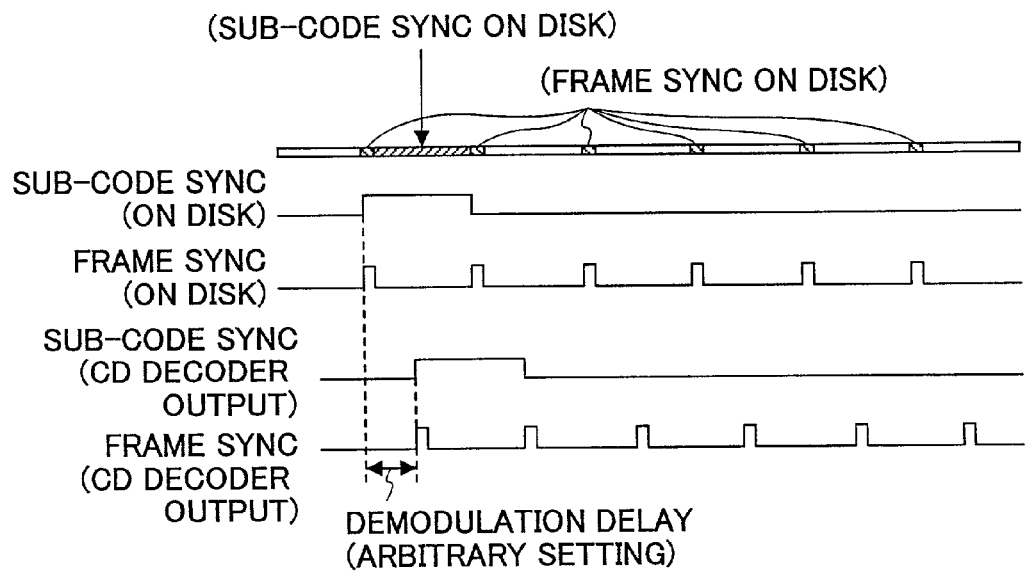
FIG. 8 is a diagram showing a relationship between the sub-code SYNC and the frame SYNC on the optical disk and the sub-code SYNC and the frame SYNC after demodulated.

FIG. 8 is a diagram showing a relationship between the sub-code SYNC and the frame SYNC on the optical disk 2 and the sub-code SYNC and the frame SYNC after demodulated. The sub-code SYNC and the frame SYNC shown in FIG. 8 can be obtained even in a case a general-purpose LSI, which is specially used for a CD decode function and cheaper, is used. As can be seen from FIG. 8, a peculiar demodulation delay occurs when the sub-code SYNC and the frame SYNC are demodulated. In order to precisely joint data on the optical disk 2 in a case of restarting to write data, it is required to correct the peculiar demodulation delay. By allowing the write-in controlling part 34 to set a correction amount, it is possible to correct the peculiar demodulation delay, regardless of differences between optical pickups or decoders of various optical apparatuses.

On the other hand, in a case of writing data to the optical disk 2, in order to check whether or not to complete to normally write data, a pseudo-write-in process (hereinafter, called test write process) is conducted to check a series of the data write operation without actually conducting the write-in process. In this case, when an interruption and a restart write process is conducted because of occurrence of the buffer under run similarly to the write-in process actually conducted, differently from the write-in control operation, data recorded on the optical disk 2 cannot be detected since the write-in process is not actually conducted. Consequently, the restart write process cannot be started. In this case, by starting to write by a timing of the Wobble signal on the optical disk 2 such as a CD-R/RW, a DVD–R/RW, or a DVD+RW, it is possible to normally restart to write data even in the case in which no data is written on the optical disk 2.

Figure 9:
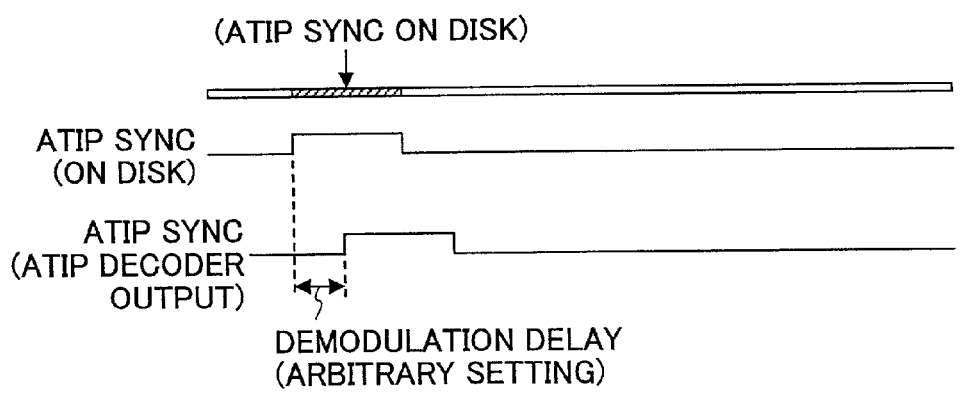
FIG. 9 is a diagram showing a relationship of the ATIP SYNC after demodulated.

FIG. 9 is a diagram showing a relationship of the ATIP SYNC after demodulated. As can be seen from FIG. 9, the peculiar demodulation delay occurs even in a case of corresponding to the restart write location using the ATIP SYNC when the test write process. When the restart write process is conducted, it is required to correct the peculiar demodulation delay in order to precisely joint data on the optical disk 2. By allowing the write-in controlling part 34 to arbitrarily set the correction amount, it is possible to precisely restart to write data, regardless of differences between optical pickups or decoders of various optical apparatuses.

Figure 10:
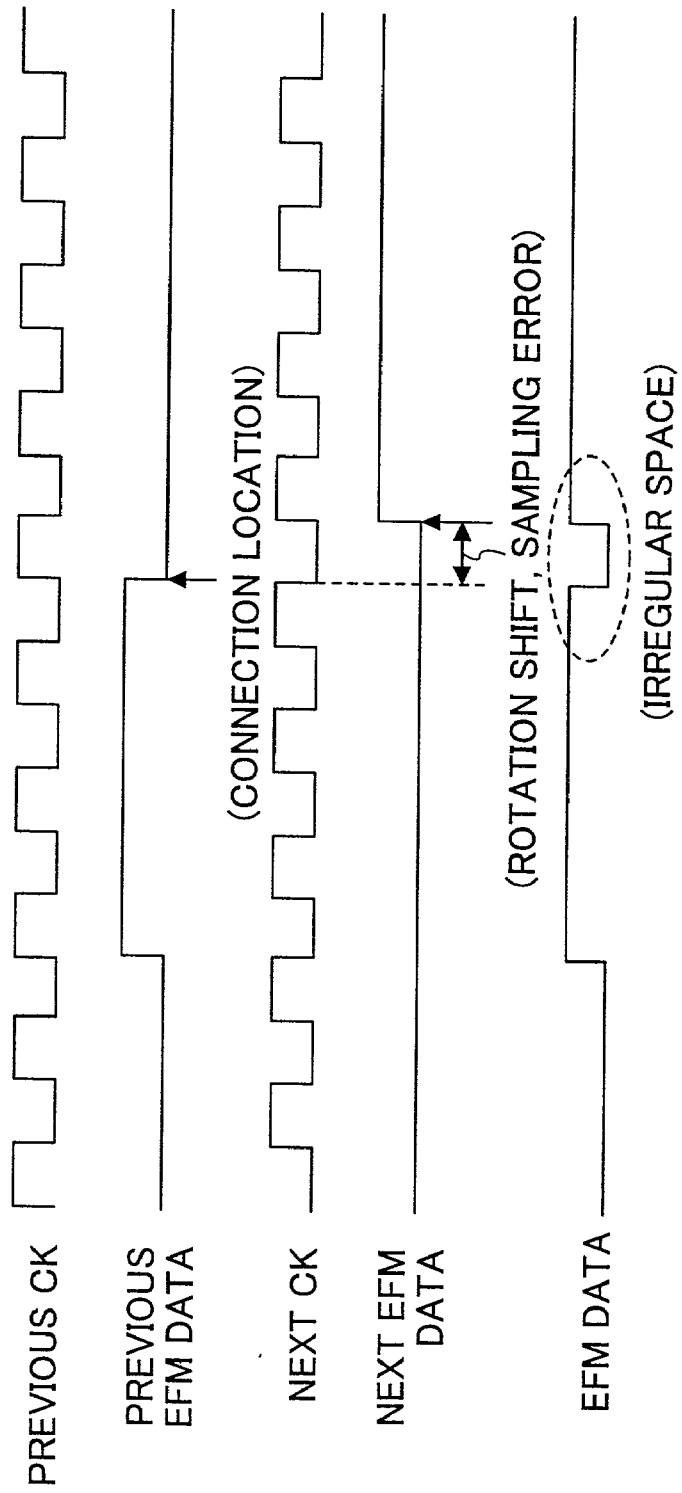
FIG. 10 is a diagram showing a state example of data connection on the optical disk.

Also, as shown in FIG. 10, in a case in which end data showing an end of written data and data to restart to write are formed by pits, a space is formed because an error of corresponding to the restart write location is caused when the restart write process is conducted. The space is irregular, that is, a state in which no pit formed is caused. Since a PLL (Phase Locked Loop) (not shown) for reading data in the CD decoder 5 is controlled by a specified minimum pit, a specified maximum pit, or a specified space length, the PLL may irregularly operate if the space length that is not specified is formed on the optical disk 2. Thus, spaces are defined as the end data written-in and the data to restart to write-in, so that it is possible to avoid problems described above even if the space is formed at the connection location.

Figure 11:
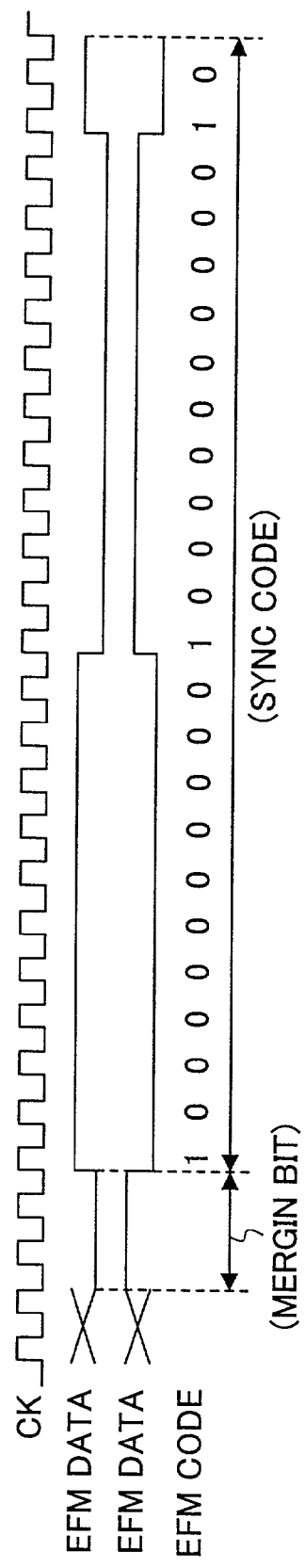
FIG. 11 is a diagram showing an example of an EFM data recorded on the optical disk.

Moreover, two types of EFM data actually recorded on the optical disk 2 are generated from an EFM code as shown in FIG. 11. When a margin bit begins from a space and the SYNC code begins from a bit, data is jointed at the margin bit. When a regular length of the margin bit, which is 3T ("T" denotes one cycle of the clock signal CK) in FIG. 11, becomes more than 3T because of a rotation change of the spindle motor 17 or the synchronization shift, it is possible to normally read data when a SYNC pattern is recognized by the synchronization protection in the CD decoder 5. That is, it is possible to successfully read data without an error for the sub-code data and main data. It should be noted that the clock signal CK in FIG. 10 and FIG. 11 indicates the channel clock signal.

Generally, the decoder 5 conducts the synchronization protection for a SYNC part and the error correction for a data part considering a reading error when data is read. It is preferable to define the connection location at the SYNC part for conducting the synchronization protection. Moreover, since a function of jointing data at a space of the SYNC pattern is provided as described above, an error caused by corresponding the restart location can be eliminated by using the synchronization protection of the CD decoder 5.

As describe above, a case of writing data to the optical disk 2 by a CLV control is exampled. Problems of defining the space at the connection location of data and handling the connection location are caused by conducting the CLV control. In the CLV control, the rotation control error of the spindle motor 17 is caused by conducting the rotation control synchronizing with a clock in a write system and also, a phase difference is caused between clocks of a read system and the write system. As a result, a location correspondence error occurs at the connection location of data on the optical disk 2. Even if a rotation change of the optical disk 2, which is caused by the phase error between the clocks of the read system and the write system, is minimized, a sampling error occurs.

On the contrary, in a CAV control (Constant Angular Velocity) for controlling to lock the PLL to the Wobble signal read from the optical disk by corresponding to a rotation number of the optical disk 2, the end location and the restart location can be synchronized with the Wobble signal. Thus, it is possible to minimize the location correspondence error caused by jointing data at the connection location more than the CLV control. In addition, in the CAV control, since a movement of the spindle motor 17 is synchronized with the clock of the write system, the rotation change of the optical disk 2 can be ignored. Accordingly, the read system and the write system are synchronized. Thus, it is possible to suppress an occurrence of the sampling error.

Furthermore, in a case of conducting the CAV control, in the clock signal generating part 30 in FIG. 4, instead of inputting the clock signal of 33.8688 MHz from the crystal oscillator (not shown), the Wobble signal, which is a binary and input via the ATIP decoder 11. The clock signal generating part 30 generates the channel clock signal based on the Wobble signal and inputs to each part of the CD encoder 12.

As described above, in the optical disk apparatus 1 according to the embodiment of the present invention, when the pause write PW is issued, the write-in controlling part 34 stores the time information at that time and information indicating how many EFM frames are used for writing data based on the sub-code SYNC to be written, to the internal register. The write-in controlling part 34 interrupts the write-in process after writing data until the end of the EFM frame. And the write-in controlling part 34 advances to the time of interrupting to write data based on the ATIP time information and the time information of the sub-code when the restart write (ReW) instruction is issued, and waits for the sub-code SYNC. When the write-in controlling part 34 detects the sub-code SYNC, the write-in controlling part 34 restarts to write data from the restart location by counting the sub-code SYNC as a frame SYNC for the number of the EFM frames. Therefore, data can be precisely jointed on the optical disk 2 when the restart write ReW is executed. In addition, the write-in process is interrupted when the buffer under run is caused. And when the write-in process is restarted, the write-in process is conducted as if data has been successively written on the optical disk 2.

As can be seen from the above explanation, in an optical disk apparatus where the present invention is applied, such as the optical disk apparatus 1, when the write-in process to the optical disk is interrupted, a data processing part and a encoder part are set to be in the waiting state after an access to a data storing part is completed, so as to stop to access the data storing part and also to stop to store data to write. Thus, the interleave can be managed and the DSV calculation can be properly conducted without any irregular calculation. Even in a case the write-in process to the optical disk is restarted after temporarily interrupted, it is possible to read data similar to a case in which data to be written is successively written without an interruption.

Moreover, an end location information storing part is provided to store end location information showing an end write location where it ends to write data on the optical disk. When it ends to write data on the optical disk, end location information of a location on the optical disk is stored in the end location information storing part. Accordingly, it is possible to easily check a seek location and a start write location when the restart write process is conducted.

In detail, the end write location is detected based on a location information obtained from data recorded the optical disk, from the end location storing part. When data recorded on the optical disk is read, based on each format of the CD-R/RW, the DVD-R/RW, and the DVD+R, a timing signal showing one sector or one frame is extracted. By using the timing signal, it is possible to synchronize with data being written on the optical disk, and it is possible to restart to write data just before the end write location.

Furthermore, in order to check whether or not to normally write data when data is written on the optical disk, instead of actually conducting the data write operation, there is the test write as a pseudo-write-in process to check a series of the data write operation. In this case, when an interruption and a restart write process is conducted because of occurrence of the buffer under run similarly to the write-in process actually conducted, differently from the write-in control operation, data recorded on the optical disk cannot be detected since the write-in process is not actually conducted. Consequently, the restart write process cannot be started. In this case, by starting to write by a timing of the Wobble signal on the optical disk such as a CD-R/RW, a DVD−R/RW, or a DVD+RW, it is possible to normally restart to write data even in the case in which no data is written on the optical disk.

Moreover, when the Wobble signal formed on the optical disk is demodulated, the peculiar demodulation delay is occurred. In order to precisely joint data on the optical disk when the restart write process is conducted, it is required to correct the demodulation delay. Thus, the correction amount is arbitrarily defined, so as to correct the demodulation delay, regardless of differences between optical pickups or decoders of various optical apparatuses.

In detail, when data is written from the end write location, a write operation instructing part can determine a restart write location and a seek location for restarting to write data by using the end location information stored in the end location information storing part.

Alternatively, a current location on the optical disk and end location information stored in the end location information storing part may be compared. When the current location corresponds to the end location information, a restart write operation may be automatically conducted. Thus, it is possible to reduce workload in the write operation instructing part used by a CPU or a like.

Also, because the end write location is not detected when the end write location stored in the end location information storing part is detected, if a seek operation is conducted again due to a retry of writing data when the restart write operation is not properly started, an irregular end write location is detected and the restart write operation is started while being unstable reading condition. According to the present invention, when the restart write operation is retired, the end write location is detected when a reading condition becomes stable after the retry of seeking the optical disk. Therefore, it is possible to prevent the restart write operation from being started in the unstable reading condition.

On the other hand, in a case in which end data showing an end of written data and data to restart to write are formed by pits, a space is formed because an error of corresponding to the restart write location is caused when the restart write process is conducted. Since a PLL (Phase Locked Loop) (not shown) for reading data is controlled by a specified minimum pit, a specified maximum pit, or a specified space length, the PLL may irregularly operate if the space length that is not specified is formed on the optical disk. Thus, spaces are defined as the end data written-in and the data to restart to write-in, so that it is possible to avoid problems described above even if the space is formed at the connection location.

In detail, by defining the connection location of data as a space of the EFM frame SYNC, an error caused by corresponding the restart location can be eliminated by using the synchronization protection conducted when read data is demodulated. Therefore, it is possible to conduct a data write operation so as to precisely reproduce data recorded on the optical disk.

Furthermore, according to the present invention, the CAV control (Constant Angular Velocity) for controlling to lock the PLL to the Wobble signal read from the optical disk, is conducted by corresponding to a rotation number of the optical disk. The end location and the restart location can be synchronized with the Wobble signal. Thus, it is possible to further minimize an error of the connection location of data more than the CLV control.

The present invention is not limited to the specifically disclosed embodiments, and variations and modifications may be made without departing from the scope of the present invention.

The present application is based on the Japanese priority applications No.2000-332409 filed on Oct. 31, 2000, entire contents of which are hereby incorporated by reference.

What is claimed is:

1. An optical disk apparatus for recording and reproducing information to an optical disk, said optical disk apparatus comprising:
   a data storing part temporarily storing data externally transferred to be written on said optical disk;
   a data processing part for conducting a predetermined data process for said data stored in said data storing part;
   an encoding part modulating and outputting said data processed by said data processing part;
   a write-in controlling part conducting an operation control of said data processing part and said encoding part, and conducting a storing control for storing said data to be written to said storing part; and
   a write-in operation instruction part detecting a state of interrupting supplying said data to be written to said data storing part, and sending an operation instruction to said write-in controlling part in accordance with a detection result;
   wherein when said write-in controlling part interrupts writing of data to the optical disk, said write-in controlling part sets said data processing part and said encoding part in a waiting state after an access to said data storing part is completed, so that the access to said data storing part is stopped, to allow said data to be written to accumulate in said data storing part, and
   wherein said write-in controlling part detects information showing an end write location based on absolute location information showing an absolute location of a blank area that is formed on the optical disk beforehand.

2. The optical disk apparatus as claimed in claim 1, further comprising an end location information part storing end location information showing an end write location where writing data is ended on said optical disk.

3. The optical disk apparatus as claimed in claim 2, wherein said write-in controlling part detects the end write location based on said information showing the end write location stored in said end location information storing part and determined based on said location information obtained from data recorded on said optical disk.

4. The optical apparatus as claimed in claim 3, wherein said write-in controlling part conducts a correction for a delay time caused when said location information read and obtained from said optical disk is demodulated, by using a predetermined correction amount.

5. The optical disk apparatus as claimed in claim 1, wherein said write-in controlling part defines a space between an end write location and a restart write location.

6. The optical disk apparatus as claimed in claim 5, wherein:
   said encoding part conducts an EFM modulation for said data processed by said data processing part to be written in accordance with a predetermined method, and outputs a modulation result; and said write-in controlling part defines a space of an EFM frame synchronization as said end location and defines said space as a start location to start, and starts to write data from said space.

7. An optical disk apparatus for recording and reproducing information to an optical disk, said optical disk apparatus comprising:
   a data storing part temporarily storing data externally transferred to be written on said optical disk;
   a data processing part for conducting a predetermined data process for said data stored in said data storing part;
   an encoding part modulating and outputting said data processed by said data processing part;
   a write-in controlling part conducting an operation control of said data processing part and said encoding part, and conducting a storing control for storing said data to be written to said storing part; and
   a write-in operation instruction part detecting a state of interrupting supplying said data to be written to said data storing part, and sending an operation instruction to said write-in controlling part in accordance with a detection result,
   an end location information part storing end location information showing an end write location where writing data is ended on said optical disk,
   wherein when said write-in controlling part interrupts writing of data to the optical disk, said write-in controlling part sets said data processing part and said encoding part in a waiting state after an access to said data storing part is completed, so that the access to said data storing part is stopped, to allow said data to be written to accumulate in said data storing part, and
   wherein said write-in controlling part detects said information showing the end write location stored in said end location information storing part based on absolute location information showing an absolute location of a blank area that is formed on the optical disk beforehand.

8. An optical disk apparatus for recording and reproducing information to an optical disk, said optical disk apparatus comprising:
   a data storing part temporarily storing data externally transferred to be written on said optical disk;
   a data processing part for conducting a predetermined data process for said data stored in said data storing part;
   an encoding part modulating and outputting said data processed by said data processing part;
   a write-in controlling part conducting an operation control of said data processing part and said encoding part, and conducting a storing control for storing said data to be written to said storing part; and
   a write-in operation instruction part detecting a state of interrupting supplying said data to be written to said data storing part, and sending an operation instruction to said write-in controlling part in accordance with a detection result,
   wherein when said write-in controlling part interrupts writing of data to the optical disk, said write-in controlling part sets said data processing part and said encoding part in a waiting state after an access to said data storing part is completed, so that the access to said data storing part is stopped, to allow said data to be written to accumulate in said data storing part,
   wherein said write-in controlling part detects the end write location based on said information showing the end write location stored in said end location information storing part and determined based on said location information obtained from data recorded on said optical disk, and
   wherein when data is written from said end write location, said write-in operation instructing part detects said end write location based on said end location information stored in said end location information storing part, after seeking an optical pickup reading and writing data to said optical disk from said end location to a location just before a predetermined location based on said end location information stored in said end location information storing part.

9. An optical disk apparatus for recording and reproducing information to an optical disk, said optical disk apparatus comprising:
   a data storing part temporarily storing data externally transferred to be written on said optical disk;
   a data processing part for conducting a predetermined data process for said data stored in said data storing part;
   an encoding part modulating and outputting said data processed by said data processing part;
   a write-in controlling part conducting an operation control of said data processing part and said encoding part, and conducting a storing control for storing said data to be written to said storing part; and
   a write-in operation instruction part detecting a state of interrupting supplying said data to be written to said data storing part, and sending an operation instruction to said write-in controlling part in accordance with a detection result,
   wherein when said write-in controlling part interrupts writing of data to the optical disk, said write-in controlling part sets said data processing part and said encoding part in a waiting state after an access to said data storing part is completed, so that the access to said data storing part is stopped, to allow said data to be written to accumulate in said data storing part,
   wherein said write-in controlling part detects the end write location based on said information showing the end write location stored in said end location information storing part and determined based on said location information obtained from data recorded on said optical disk, and
   wherein when data is written from said end location, said write-in controlling part detects said end write location based on said end location information stored in said end location information storing part, after seeking an optical pickup reading and writing data to said optical disk from said end location to a location just before a predetermined location based on said end location information stored in said end location information storing part.

10. The optical disk apparatus as claimed in claim 9, wherein when data is written from said end write location and when writing data is not started from said end write location, after a restart write operation to the optical disk is interrupted and said write-in controlling part controls said optical pickup to seek from said end location to said location just before said predetermined location based on said end location information stored in said end location information storing part again, said write-in controlling part detects said end write location based on said end location information stored in said end location information storing part.

11. An optical disk apparatus for recording and reproducing information to an optical disk, said optical disk apparatus comprising:
- a data storing part temporarily storing data externally transferred to be written on said optical disk;
- a data processing part for conducting a predetermined data process for said data stored in said data storing part;
- an encoding part modulating and outputting said data processed by said data processing part;
- a write-in controlling part conducting an operation control of said data processing part and said encoding part, and conducting a storing control for storing said data to be written to said storing part;
- a write-in operation instruction part detecting a state of interrupting supplying said data to be written to said data storing part, and sending an operation instruction to said write-in controlling part in accordance with a detection result; and
- a clock signal generating part including a Phase Locked Loop circuit for generating a reference clock signal for writing data by corresponding to a rotation number of said optical disk so as to lock to a Wobble signal read from said optical disk in order to conduct a Constant Angular Velocity control,
- wherein the reference clock signal is used to obtain a data write-in timing when data is recorded on said optical disk; and
- wherein when said write-in controlling part interrupts writing of data to the optical disk, said write-in controlling part sets said data processing part and said encoding part in a waiting state after an access to said data storing part is completed, so that the access to said data storing part is stopped, to allow said data to be written to accumulate in said data storing part.

* * * * *